Sept. 21, 1971  TAKASHI KUMAGAI ET AL  3,606,656
METHOD OF COVERING POLES, SHAFTS AND SIMILAR OBJECTS
Filed June 29, 1970  2 Sheets-Sheet 1
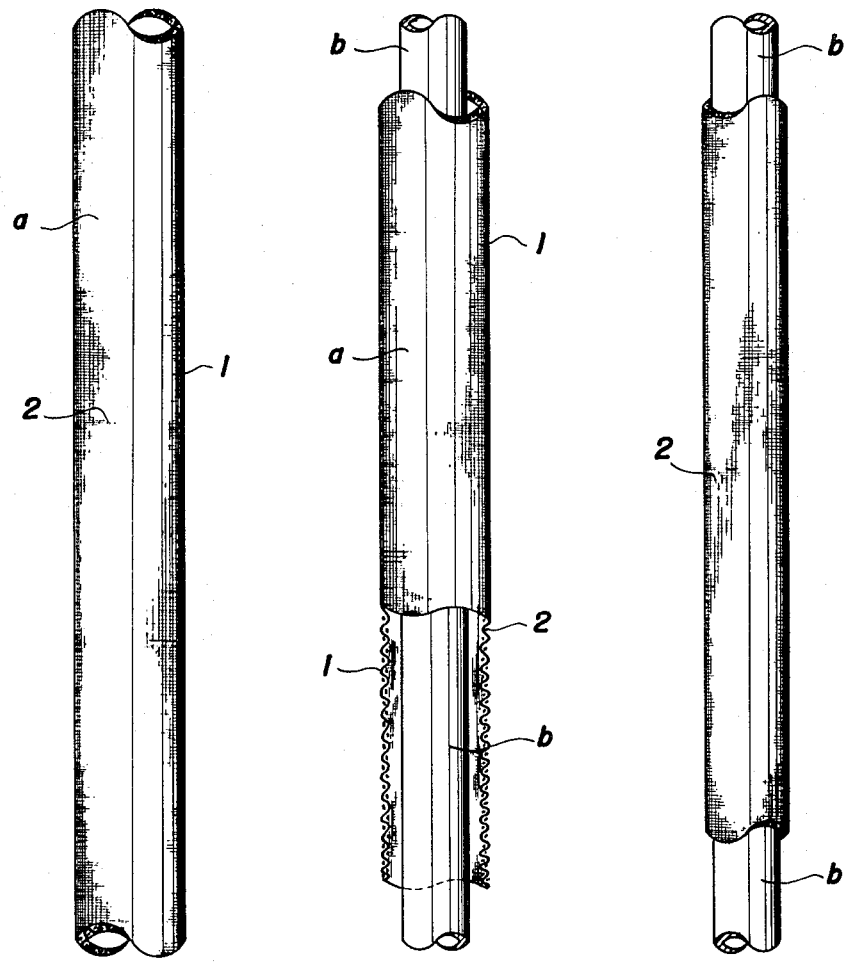

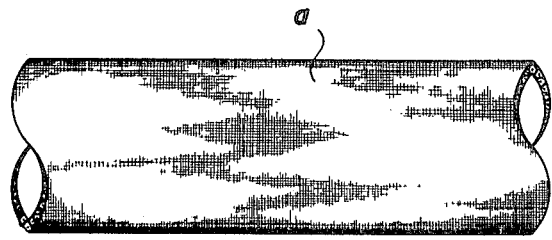
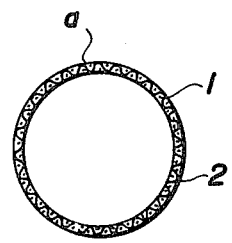
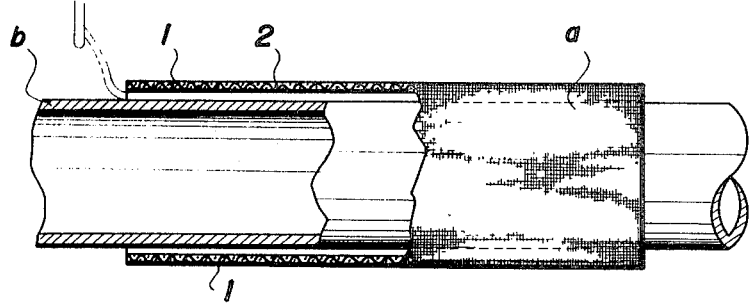
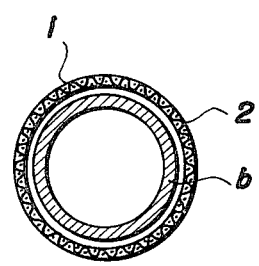
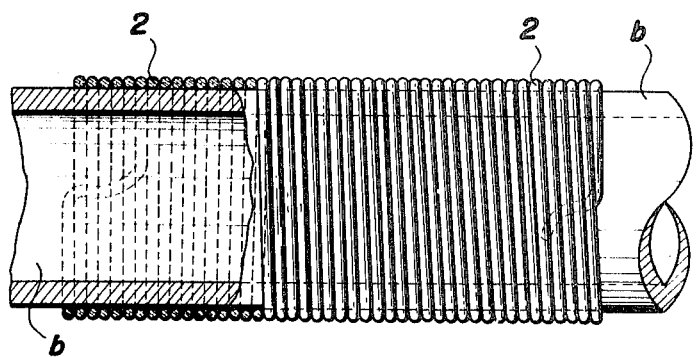
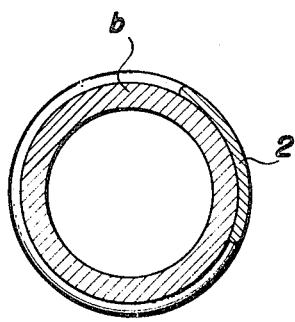

United States Patent Office 3,606,656
Patented Sept. 21, 1971

3,606,656
METHOD OF COVERING POLES, SHAFTS AND SIMILAR OBJECTS
Takashi Kumagai and Tasuku Miyanabe, Tokyo, Japan, assignors to Olympic Fishing Tackle Co., Ltd., Saitama-ken, Japan
Filed June 29, 1970, Ser. No. 50,371
Int. Cl. D06 1/00
U.S. Cl. 28—76T
7 Claims

ABSTRACT OF THE DISCLOSURE

Method of covering the surface of a shaft or other bar member, using a cylindrical woven sleeve, wherein the woof is made of a heat shrinking fiber and the warp of a soluble fiber. The cylindrical woven sleeve is disposed to loosely cover the desired portion of the shaft and is then heated and washed by the solvent. The warp dissolves and is removed while the woof shrinks so as to tightly wrap around the surface of the shaft.

BACKGROUND OF THE INVENTION

The present invention relates to a method of covering cylindrical workpieces, and more particularly, to a method of covering fishing poles, signal poles, shafts and similar objects.

THE PRIOR ART

Heretofore the methods of covering bar or pipe products included plating, painting, simple covering with a vinyl tube or a woven cloth, and covering by simple yarn winding. The processes involved in these prior art methods still required handiwork, and although industrial covering methods have progressed, it is noted that the beauty of yarn design, including toughness and function has not advanced.

OBJECTS OF THE INVENTION

An object of this invention is to wrap a yarn cover over the surface of a shaft made of metal, wood, or synthetic resin and the like, so as to form a light, strong surface layer having a decorative apperance with anti-rust and waterproof properties, so that the shaft is suitable for fishing rods, handrails and other bar or pipe products.

Another object of the invention is to provide an effective method of forming the wound yarn cover on the surface of a bar product.

SUMMARY OF THE INVENTION

Generally speaking, the present invention contemplates a method of covering the surface of a shaft or other bar member, using a cylindrical woven sleeve wherein the woof is made of a heat shrinking fiber and the wrap of a soluble fiber. The cylindrical woven sleeve is disposed to loosely cover the desired portion of the shaft and is then heated and washed by the solvent. The warp dissolves and is removed while the woof shrinks so as to tightly wrap around the surface of the shaft.

The invention, as well as other objects and advantages thereof will become more apparent from the following detailed description when taken in conjunction with the accompanying drawings, in which:

BRIEF DESCRIPTION OF THE DRAWINGS

FIG. 1 shows a side elevational view of a cylindrical woven cloth;

FIG. 2 is a cross-sectional view of the cloth shown in FIG. 1;

FIG. 3 shows a side elevational view of a bar member with the cylindrical woven cloth around the bar;

FIG. 4 is a cross sectional view of the assembly shown in FIG. 3;

FIG. 5 presents a side elevational view of a finished product;

FIG. 6 is a cross-sectional view of the product shown in FIG. 5;

FIGS. 7 through 12 provide greater detail with regard to one of the embodiments illustrating a yarn winding condition according to the invention, wherein;

FIG. 7 is a side elevational view of a cylindrical woven cloth;

FIG. 8 is a cross-sectional view of the woven cloth shown in FIG. 7;

FIG. 9 is a side elevational view, partially in section, of the cylindrical woven cloth covering a shaft;

FIG. 10 is a cross-sectional view of the assembly shown in FIG. 9;

FIG. 11 is a side elevational view, partially in section, of a finished product; and, FIG. 12 is a cross-sectional view of the finished product shown in FIG. 11.

DETAILED DESCRIPTION

As shown in detail in the accompanying drawings, a cylindrical woven sleeve $a$ is used as an envelope which is placed around an elongated cylindrical workpiece, such as pipe. The woven sleeve has a warp 1 and woof 2. This cylindrical woven sleeve has a given length with its inside diameter slightly larger than the outside diameter of the workpiece shaft $b$ inserted therethrough.

For the warp 1, the materials used are those which can be washed or dissolved away by pouring hot or boiling water thereover, such as water soluble vinyon, and for the woof 2, heat shrinking materials such as polyvinyl chloride are used. Both the warp 1 and the woof 2 form a long cylindrical sleeve of woven cloth $a$. The woof 2 is a single continuous piece of yarn, each end of which is held firmly at the winding ends of the woven cloth of a given length. The portion of a shaft $b$ to be covered is loosely inserted in the cylindrical woven cloth $a$, with the warp 1 of the cylindrical woven cloth $a$ being arranged in the lengthwise direction of the shaft $b$, while the woof 2 is in the transverse direction of the shaft $b$. The inventive concept requires that hot or boiling water be poured over the workpiece to wash away the lengthwise warp 1, while the woof 2 shrinks, due to its heat shrinking property, resulting in adhering tightly around the workpiece $b$. A suitable temperature for the hot water poured is higher than 70° C. The washing away of the warp 1 is done promptly. The polyvinyl chloride fiber employed as the woof 2 in the embodiments is a chemical fiber which can be dyed at will. Therefore, the fiber provides wound yarn of any desired color, by dyeing it before it is woven. Taking the outside diameter of the shaft $b$ into consideration, a woof 2 with the most suitable heat shrinkage properties is employed for the cylindrical woven cloth which loosely covers the shaft $b$ inserted therethrough. In the case of the woof 2 of the embodiments shown in the drawing, the shrinkage of polyvinyl chloride is expected in the range of 20% to 35%, and with this type of shrinkage, sufficient adhesion to the shaft can be obtained. This means that the cylindrical woven cloth $a$ may also be used to tightly secure pressure legs for mounting other accessories onto the surface of the shaft $b$, as well as for decoration, to stop slippage and for a reinforced cover. In this case, the legs for mounting accessories to be attached are inserted between the shaft $b$ and the cylindrical woven cloth $a$.

Thus, according to the present invention, a single continuous winding piece of yarn having heat shrinking properties is used as the woof, while water soluble yarn is used as warp, both kinds of yarn forming an elongated cylinder, thereafter a workpiece, such as a fishing rod, a shaft or similar objects, is inserted into this cylinder, then through the heating and washing treatment, the woof shrinks, while the warp is washed away. By this process the woof alone remains wrapped tightly, in a screw-thread arrangement, around the surface of the shaft after being dried. This method automatically provides a uniform wound yarn cover, establishing a much tighter adhesion to each yarn wound in a coil around the shaft than that of prior art. Although because of the costs, a water-soluble warp yarn is used. There may be times when a water soluble warp yarn is not desired, i.e., an organic solvent may be used. In this embodiment the woven sleeve $a$ is formed into an elongated cylindrical shape. As the warp 1 of this cylindrical woven cloth $a$, a fiber material is used which is softened and fused in the presence of an organic solvent, the fiber material being, for example, rayon.

For the woof 2 for transverse weaving, a heat shrinking synthetic fiber material, such as polyvinyl chloride is employed and woven together with the warp into a cylindrical sleeve. Into this cylindrical woven sleeve $a$, a core rod $b$ is loosely inserted and then subjected to a heat treatment. A hollow bar member made of metal, synthetic resin and so on, is used as this core rod $b$. The bar member $b$ should be resistant against heat and chemicals, since in this embodiment core rod $b$, with the woven cloth $a$ as a cover thereon, is treated in a heating oven in order to heat the woof 2 and shrink it and then it is subjected to an immersing treatment in an organic solvent. The core rod $b$ is loosely inserted into the cylindrical woven cloth $a$, and then heated in a heating oven. In this heat treatment, it is important to consider the shrinking properties of the woof 2. Thus, polyvinyl chloride begins to shrink at 60° C., and its shrinkage reaches 40–50% at 100° C. Thus, by setting the expected shrinkage value in the range of 20–35%, the best results are obtained and each piece of the warp 1 is closely arranged and secured tightly to the core rod $b$, together with the woof 2. The core rod $b$ thus treated is then immersed in an organic solvent such as methyl ethyl ketone to cause each thread of the warp 1 to soften and be fused with adjacent threads, and then dried to set.

Thus, according to the present invention, the surface of a fishing rod is loosely covered with cylindrical woven cloth which is woven with warp having softening and fusing properties in an organic solvent and with the woof of a heat shrinking fiber material. Then the core rod inserted into the thus obtained woven sleeve is heated in a heating oven, thereafter immersed into an organic solvent and taken out to be dried. With such an arrangement, the woof shrinks under the heat so as to set each of the warp threads in close contact arrangement, both the woof and the warp forming a surface layer establishing a tighter adhesion to the surface of the core rod, and then by immersing the workpiece in the organic solvent and drying, the warp causes the surface layer to soften and the threads are fused and stick to each other. Thus, nothing is needed to prevent rust, as is necessary where metal core rods are used, and a smooth cover for the surface layer is easily produced through the covering treatment with the cylindrical woven cloth. In case of surface painting, paints spread well on the layer and never exfoliate therefrom. In addition, the cylindrical woven sleeve used in the present invention is made of synthetic fibers whose tough structure contributes to further reinforcement, and by making use of fibers which can be readily dyed.

Products may be produced having beautifully colored patterns thereon which will not readily exfoliate. Furthermore, a conventional process for setting a thread guide stop can be eliminated by inserting a thread guide between the woven cloth and the core rod, which may also provide a finished rod with a decorative reel.

FIGS. 7 to 12 show the preferred embodiments relating to FIGS. 1 to 6, illustrating the winding condition of yarn around the shaft, fishing rod or the like.

In conventional fishing rods made by the handiwork way of winding yarn around the surface of a fishing rod, this has been done with a view to taking advantage of the beauty of the yarn design, toughness, and the function or particular property of the yarn for decorative winding of the accessory metal fitted to a fishing rod, as a guide or a slip stop. On the other hand, however, little progress from the mere handiwork process has been made. The method of the present invention makes full use of the function or property of the yarn and by greatly improving the productivity. Namely, with the present industrial method of this invention, there is no loss of efficiency as in the handiwork method, and production costs are greatly reduced.

For the purpose of giving those skilled in the art a better understanding of the invention, the following example is given.

EXAMPLE

A sleeve $a$ woven into a cylindrical form with warp 1 and woof 2 is formed to have a length with its inside diameter $a$ slightly larger than the outside diameter of a fishing rod or the like $b$. For the warp 1, such materials as water soluble vinyon are used, which can be washed away by pouring hot or boiling water thereover, while for the woof 2, heat shrinking materials such as polyvinyl chloride is used, and both the warp and the woof form an elongated cylindrical cloth structure. The woof 2 is formed of a single continuous piece or pieces of yarn, with each end thereof being positioned in the opposite open ends of the cylindrical woven cloth of a given length. The desired portion of the fishing rod $b$ is inserted and loosely covered with the cylindrical woven cloth $a$, with the warp 1 of the cylindrical woven cloth $a$ being arranged in the lengthwise direction of the fishing rod $b$, and with the woof 2 in the transverse direction of the rod $b$. Over this workpiece hot or boiling water is poured to wash the lengthwise warp 1 away, while the woof 2 shrinks owing to its heat shrinking property resulting in its tight adhesion around the fishing rod $b$. A suitable temperature of the hot water poured over the workpiece is higher than 70° C. The warp 1 is washed away promptly.

Since the polyvinyl chloride fiber employed for the woof 2 is a chemical fiber which can be dyed at will, the fiber provides a yarn cover of any desired color by dyeing the fiber before weaving. When several pieces of yarn are used as the woof, it is possible to produce yarn dye patterns.

Taking the outside diameter of a fishing rod $b$ into consideration, the woof 2 of the most suitable heat shrinkage is employed for the cylindrical woven cloth $a$ which covers the fishing rod $b$ loosely, thus a tight arrangement of the woof on the rod is achieved after hot water is poured. In the case of the woof 2 of the foregoing example, the shrinkage of polyvinyl chloride is expected to be in the range of 20 to 35%, thus with this shrinkage, sufficient adhesion around the surface of the fishing rod can be attained to meet the desired objective. This means that the cylindrical woven cloth $a$ may also be used for mounting such accessory pieces as a leg tightly with pressure, for mounting a guide 3 to the surface of the fishing rod $b$, as well as for decoration, slip stopping, cover reinforcement, and so on. In this case, the leg for mounting the guide 3 is inserted between the fishing rod $b$ and the cylindrical woven cloth $a$.

Thus, according to the present invention, a single continuous winding yarn having heat shrinkage properties is employed as the woof while water soluble fiber is used as the warp, both yarns form an elongated cylinder. Thereafter, a fishing rod is covered loosely with this cylindrical woven cloth, then through a heating and washing treatment the woof shrinks while the warp is washed away.

With such an arrangement, the woof alone remains tightly wrapped in a thread-like arrangement around the surface of the fishing rod after drying. Thus, this method provides a uniform wound yarn cover in an automatic way, establishing much tighter adhesion of each yarn wound around the rod than that obtained through handiwork.

As mentioned, according to the invention, this woven cloth cylinder wraps a bar member. In this connection, this cloth sleeve should have its inner diameter about 20–35% larger than the outer diameter of the bar member inserted therethrough. This is because although the shrinkage of heat shrinking fiber is nominally about 40–50% at 100° C., it has been experimentally proved that the best results are obtained by estimating a 20–35% shrinkage of the fiber.

When a steel pipe is employed for the present invention as a bar member, usual pre-treatment may in some cases be applied to the steel pipe before the pipe is covered with the cloth sleeve. With the pre-treatment, subsequent processes will be simplified, such pre-treatment involves a grease-removing treatment with trichloroethylene; acid or an alkali treatment, coating with phosphate and antirust paint spreading, and so on.

It should be noted that the suitable temperature of hot air used for heating is around 60° to 130° C., and that resin saturation treatment of the special woven sleeve for an envelope is carried out under normal or decreased pressure.

As stated already, although shrinkage ratio of the heat shrinking fiber is about 1.3 to 1.5, various experiments according to this invention show that by estimating a 20 to 35% shrinkage, best results are obtained. Thus, when a tapered pipe is employed, the pipe can be covered with an envelope with its shrinkage estimated in the above range. When an envelope is woven into a tapered form in advance, it is of course possible to cover the surface of any tapered pipe.

What is claimed is:
1. A method of covering the surface of a cylindrical workpiece comprising the steps of positioning a cylindrical woven sleeve formed with a woof of a heat shrinking fiber and with a warp of a solvent soluble fiber; inserting said workpiece into said cylindrical woven sleeve, said sleeve loosely covering a desired portion of said workpiece; heating and washing said covered workpiece whereby said warp is dissolved and removed while said woof shrinks to coil in tight threads around the surface of the workpiece.

2. The method claimed in claim 1, wherein said warp is water soluble.

3. The method claimed in claim 1, wherein said warp is soluble in a non-aqueous solvent.

4. A method of surface covering a cylindrical workpiece comprising the steps of positioning a woven sleeve formed with a warp of a filter which is softened and dissolved by an organic solvent and with a woof of a heat shrinking fiber, inserting said workpiece in the cylindrical woven sleeve to loosely cover said core workpiece; subjecting said workpiece to a heat treatment to shrink said woof; immersing the workpiece in an organic solvent to melt said warp; and drying the workpiece.

5. A method of surface covering a cylindrical workpiece wherein a cylindrical woven sleeve with a woof of heat shrinking fiber and with warp of a solvent soluble fiber is positioned with said woof fiber having inwardly turned free ends, loosely covering the desired portions of a workpiece with said sleeve; heating and washing said workpiece so that said warp is dissolved and is removed while said woof shrinks and is tightly coiled around the surface of the workpiece with each end of said woof free ends being caught in between the sleeve and the workpiece.

6. The method of claim 5, wherein said warp is water soluble.

7. The method of claim 5, wherein said warp is soluble in a non-aqueous solvent.

References Cited
UNITED STATES PATENTS

| | | | |
|---|---|---|---|
| 1,860,314 | 5/1932 | Mendel | 28—76TX |
| 2,836,181 | 5/1958 | Tapp | 26—56UX |
| 3,105,492 | 10/1963 | Jeckel | 139—387RX |
| 3,337,673 | 8/1967 | Jeckel | 264—324 |

MERVIN STEIN, Primary Examiner

U.S. Cl. X.R.
139—387R